United States Patent [19]

Murray

[11] Patent Number: 4,619,812
[45] Date of Patent: Oct. 28, 1986

[54] CARBON BLACK PRODUCTION APPARATUS

[75] Inventor: Lawrence K. Murray, Bartlesville, Okla.

[73] Assignee: Phillips Petroleum Company, Bartlesville, Okla.

[21] Appl. No.: 688,678

[22] Filed: Jan. 4, 1985

[51] Int. Cl.[4] ............................................. C09C 1/48
[52] U.S. Cl. ..................................... 422/156; 422/158; 422/202; 422/241; 423/454
[58] Field of Search ............... 422/150, 156, 158, 202, 422/241, 240; 423/445, 454

[56] References Cited

U.S. PATENT DOCUMENTS

| | | | |
|---|---|---|---|
| 2,765,359 | 10/1956 | Pichler et al. | 422/202 |
| 2,770,536 | 11/1956 | Walker | 422/202 |
| 3,057,688 | 10/1962 | Williams | 23/209.4 |
| 3,256,066 | 6/1966 | Higgins | 23/259.5 |
| 3,393,043 | 7/1968 | Kribbe et al. | 422/202 |
| 3,565,586 | 2/1971 | Kiyonaga | 422/156 |
| 3,615,210 | 10/1971 | Jordan et al. | 23/209.4 |
| 4,288,408 | 9/1981 | Guth et al. | 422/156 |
| 4,343,626 | 8/1982 | Peise et al. | 422/202 |
| 4,402,929 | 9/1983 | Hunt | 422/150 |
| 4,540,560 | 9/1985 | Henderson et al. | 423/445 |

FOREIGN PATENT DOCUMENTS

| | | | |
|---|---|---|---|
| 558751 | 7/1957 | Belgium | 422/202 |
| 1359216 | 7/1974 | United Kingdom . | |

Primary Examiner—David L. Lacey
Attorney, Agent, or Firm—William R. Sharp

[57] ABSTRACT

An apparatus and method for producing carbon black wherein a refractory reactor lining is effectively cooled. A combustible gaseous mixture is injected into a chamber defined by the refractory lining, oil feedstock also being injected into the chamber. Coolant fluid is passed through a passageway in the refractory material.

1 Claim, 1 Drawing Figure

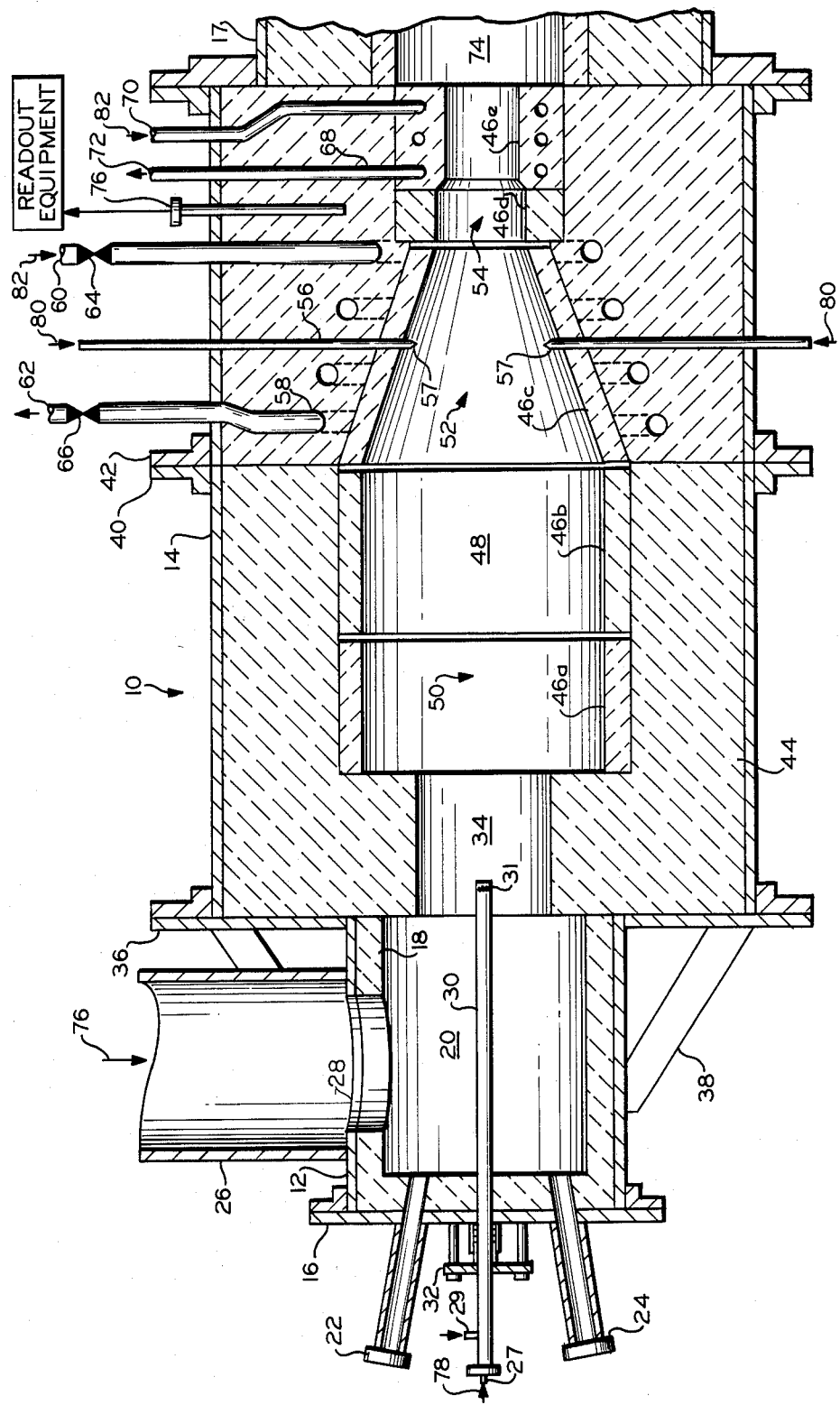
FIG. I

CARBON BLACK PRODUCTION APPARATUS

BACKGROUND OF THE INVENTION

This invention relates to an apparatus wherein a hollow refractory section, having a combustible mixture introduced therein, is effectively cooled. In another aspect, the invention relates to a process for cooling such a refractory section.

In particular, the present invention is applicable to oil furnace type carbon black production. In this type of carbon black process, oil feedstock is sprayed into the turbulent products of combustion produced by the reaction of a fluid fuel with an oxygen containing gas such as air. The resulting mixture is passed into a carbon forming reaction zone wherein the feedstock is converted into carbon black due to the intense heat generated by the above-mentioned combustion.

Such furnace type reactors typically include a refractory lining whose interior surface defines the chamber or chambers in which combustion and carbon black formation takes place. Temperatures within the reactor reach well over 3000° F. Upon exposure to these high temperatures over a period of time the refractory material will tend to crack, and/or chunks of refractory may break off. Depending on the type of refractory employed, some melting can occur. Therefore, refractory in a carbon black reactor has a typically limited life, and must be repaired or replaced periodically.

SUMMARY OF THE INVENTION

It is, therefore, an object of the invention to provide an apparatus and method wherein damage to refractory chamber forming material in a furnace is minimized.

It is also an object of the invention to provide an apparatus and method wherein such refractory material is effectively cooled to lengthen refractory life.

The above objects are realized in an apparatus which includes a hollow refractory section whose interior surface defines a chamber, wherein a means is provided for introducing a combustible mixture into the chamber. The refractory is effectively cooled by a cooling means which passes a coolant fluid through a passageway in the refractory section.

In another aspect, a process includes: flowing a stream of hot gases through a chamber, the chamber being defined by the interior surface of a hollow refractory section and flowing a coolant fluid through a passageway in the refractory section.

According to a preferred embodiment, the passageway is defined by a tubular member embedded in the refractory lining of a carbon black furnace type reactor.

BRIEF DESCRIPTION OF THE DRAWING

FIG. 1 is a schematic cross-sectional view of one embodiment of the present invention.

DESCRIPTION OF THE PREFERRED EMBODIMENTS

Referring now to FIG. 1, the illustrated apparatus includes a reactor shell shown generally at 10 which includes metallic, preferably steel, tubular sections 12, 14, and 17. As shown, one end of tubular section 12 is closed off by means of an end plate 16. Interior surfaces of plate 16 and section 12 are lined with a refractory material 18 whose interior surface defines a chamber 20. Attached to end plate 16 are sight glasses 22 and 24, wherein each sight glass generally comprises a tubular member having an end fitting which has a piece of glass mounted therein through which an observer can view the combustion reaction and injection of oil feedstock in the apparatus, hereinafter described. A duct 26 for conducting an oxygen containing gas therethrough opens into chamber 20 by means of port 28. A fuel gas bayonet 30 extends through end plate 16 and the refractory material. A conventional packing gland assembly 32 is provided to prevent escape of gas from chamber 20 around the exterior surface of bayonet 30. Bayonet 30 generally comprises a tubular member having an opening 29 for axial air and concentric with a conventional fuel gas supply tube 27 centered therein, the bayonet also having a capped end. Near the capped end, there are provided a plurality of holes 31 in the bayonet sidewall through which fuel gas and axial air injected into the bayonet can flow into passageway 34.

As shown, tubular section 14 has an end plate 36 mounted thereon, tubular section 12 being suitably attached to plate 36. Support members at 38, wich extend between plate 36 and section 12, can be provided to support tubular section 12. Preferably, tubular section 14 is divided into at least two portions suitably joined by means of flanges 40 and 42. These flanges permit easy disassembly for maintenance purposes.

Tubular section 14 is also lined with refractory material to resist the high reaction temperatures. A castable refractory material, preferably containing alumina, lines the interior surface of tubular section 14. Mounted to the interior surface of castable refractory 44 are a plurality of refractory elements 46a–e. The various surfaces of these elements define a chamber 48. Typically, elements 46a–e can be precasted by a suitable manufacturer such as Didier-Taylor Corp. of Cincinnati, Ohio. These elements are usually a very high quality refractory material such as a heavy duty chrome-alumina refractory of high alumina content to resist the high temperatures within chamber 48. In lining tubular section 14, elements 46a–e are usually positioned within the interior of section 14 by taper pins, followed by pouring of castable refractory around elements 46a–e. Such an arrangement permits the use of a cheaper, lower quality refractory material (the castable refractory) for portions of the refractory lining not in direct contact with hot gases in chamber 48.

Chamber 48 includes a combustion zone 50, a converging zone 52, and a throat zone 54. Combustion zone 50 is defined by generally cylindrical refractory elements 46a and 46b. Converging zone 52 is defined by generally frustoconical refractory element 46c. Element 46c has two ends, wherein one end is of a larger diameter than the other end. Element 46c is positioned such that gas flowing through chamber 48 enters the larger end, passes through zone 52, and exits the smaller end into throat zone 54. In other words, since gas flow is generally in a direction from left to right in the FIGURE, chamber 48 can be considered to have an upstream end and a downstream end, wherein the large end of frustoconical zone 52 faces the upstream end of chamber 48. Throat zone 54 is in direct fluid communication with the small end of zone 52.

A plurality of tubular members 56 (only two of which are shown) for conducting therethrough a carbonaceous feedstock, such as oil, extend through tubular section 14 and the refractory material so as to empty into converging zone 52 through nozzles 57. Typically, four to six nozzles 57 are provided, each being equally spaced from one another so as to be circumferentially spaced around zone 52. The nozzles 57 can be selected to introduce feedstock as a spray or coherent stream, although a spray pattern is presently preferred. In addition, although the tubular members 56 are shown such that their longitudinal axis are generally normal to the chamber axis, the nozzles can be canted so as to emit feedstock in a downstream or upstream direction.

A tubular member 58 having an inlet 60 and outlet 62 is provided, a portion of this tubular member being spirally shaped so as to form a tubular coil. The tubular member 58 is adapted to receive coolant fluid therethrough. The spiral tubular coil is embedded in the castable refractory so as to be generally coaxial with respect to chamber 48, and such that it surrounds converging zone 52. In addition, the tubular coil preferably extends substantially along the entire length of converging zone 52 to maximize cooling, as will be explained below, in this critical region.

Most preferably, the tubular coil is generally frusto-conically shaped to conform to the shape of converging zone 52. Tubular member is most typically metallic, and most preferably a high temperature resistant steel alloy such as 316 alloy or a chrome-molybdenum alloy, although carbon steel might also be used. Additionally, valves 64 and 66, which can be of the diaphragm type, for example, can be provided along tubular member to regulate flow of coolant fluid through the tubular member.

Most conveniently, tubular member 58 is embedded into castable refractory 44 by suitably positioning the coiled portion around element 46c, and pouring castable refractory around the member.

A second tubular member 68 for conducting coolant fluid therethrough is provided having an inlet 70 and outlet 72, a portion of the tubular member 68 being also spirally coiled. The spirally coiled portion is shown as being embedded in the refractory element 46e. Thus, the coiled portion of member 68 is coaxially positioned with respect to chamber 48, but so as to surround at least a portion of throat zone 54. Similar materials may be utilized for tubular member 68 as discussed in regard to tubular member 58. Although not shown, valves could also be employed in conjunction with tubular member 68. It is presently thought that a manufacturer of precasted element 46e could best mold member 68 into element 46e at the factory.

Although the above discussed tubular members 58 and 68 are shown as having spirally coiled embedded portions, other shapes could also be used. Whatever shape is employed, maximum surface area contact between tube and refractory is desirable to achieve the maximum cooling effect. Additionally, although two tubular cooling members are shown in the illustrated embodiment, any number could be used within certain space limitations, etc.

The spirally coiled portions of tubular members 58 and 68 are positioned around only converging zone 52 and throat zone 54, since it has been found that the refractory in these zones is most susceptible to cracking, erosion, and/or melting, etc.

A third tubular section 17 is connected to the downstream end of section 14 by means of flanges. Section 17 is also lined with refractory material whose interior surface defines a reaction chamber 74. As shown, reaction chamber 74 is in fluid communication with throat zone 54. Only a portion of reaction chamber 74 is shown in the FIGURE.

As an additional feature, a conventional thermocouple, schematically shown at 76, may be provided to monitor the temperature of the refractory material. A signal from the thermocouple may be coupled to suitable readout equipment such that an operator can monitor the refractory temperature and adjust valves 64 and 66, for example, to adjust coolant flow rate so as to maintain the refractory at or below a desired temperature. Or, conventional control means could be provided to automatically set valves 64 and 66 to maintain the desired refractory temperature.

In operation, an oxidant fluid is injected, as shown at 76, into chamber 20 through duct 26. Air is most conveniently used as the oxidant fluid, preferably preheated at a temperature of from about 700°0 to about 1500° F. Pure oxygen or other oxygen enriched air is also suitable as the oxidant fluid. A fuel gas is injected, as shown at 78 into bayonet 30. Fuel gas accordingly exits the bayonet through holes 31 so as to flow into passageway 34 and mix with the oxidant fluid to form a combustible mixture. Suitable fuel gases include natural gas, acetylene, and propane. The combustible mixture can be ignited by a pilot light, spark, glow plug, or any suitable igniter (not shown) which can be mounted within the apparatus. Or, no igniter need be provided. In this case, sight glasses 22 or 24 could be removed, and the mixture ignited manually through the opening. Upon combustion of the fuel gas intense heat is generated accordingly, temperatures within combustion zone 48 typically ranging from about 2800° to about 3400° F.

Oil feedstock, whose flow is shown schematically at 80, is preferably preheated to about 450° F., and is injected into converging zone 52 by means of nozzles 57. The feedstock can be any hydrocarbon feed suitable for forming carbon black. Generally, the feedstock will be a liquid, and contain about 90 weight percent carbon. Accordingly, the fuel gas, oxidant fluid, and feedstock mix turbulently in converging zone 52, the mixture passing through throat zone 54 into reaction chamber 74 such that the feedstock breaks down to coke. Typically, some means (not shown) such as a water spray is provided downstream to quench the gas flow in the reaction chamber and stop the reaction.

During gas flow through the apparatus, a coolant fluid 82 is passed through tubular members 58 and 68 such that coolant fluid flows around converging zone 52 and throat zone 54 through passageways defined by the tubular members. As noted above, valves 64 and 66 can be used to regulate coolant fluid flow rate through tubular member 58 and thus also regulate refractory temperature. Suitable valves can also be provided for tubular member 68. The coolant fluid is typically at a fairly low temperature of, for example, less than 100° F. (substantially below that temperature of the refractory) upon entering each of tubular members 58 and 68. Accordingly, heat is transferred from refractory material contacting the tubular members to the coolant fluid flowing therethrough. Most preferably to maximize refractory life, a flow rate of coolant is maintained to keep the refractory temperature below about 2000° F. As already noted, the refractory temperature is conveniently monitored by means of thermocouple 76. Suitable coolant fluids for use with the present invention include molten inorganic salt, water, and Dowtherm ™ (such as Dowtherm A or diphenyl-diphenyl oxide).

Thus there is provided by the invention an effective means for cooling refractory material in a carbon black reactor which can be expected to maintain refractory temperature well below 2000° F. Such cooling serves to lengthen refractory life, and thus reduces maintenance expense.

Obviously many modifications and variations of the present invention are possible in light of the above teachings. It is therefore to be understood that within the scope of the appended claims the invention may be practiced otherwise than as specifically described.

What is claimed is:

1. A carbon black producing apparatus comprising:
   a hollow refractory section having an interior surface which defines a chamber, said chamber having an upstream end and a downstream end, and also having a converging zone generally frustoconical in shape, wherein said converging zone has a first end and also a second end which faces the upstream end of said chamber and which is of a larger diameter than said first end, said chamber also having a throat zone, adjacent to the downstream end of said chamber, in direct fluid communication with said converging zone first end, said chamber additionally having a combustion zone adjacent said upstream end and in direct fluid communication with said converging zone second end;
   means for introducing a combustible mixture into said combustion zone at said upstream end;
   means for introducing a carbonaceous feedstock directly into said converging zone so that the feedstock mixes with the combustible mixture; and
   a cooling means for passing coolant fluid through a passageway defined by at least one spirally shaped tubular member embedded in said refractory section so as to be coaxially positioned with respect to said chamber and so as to extend axially along substantially the entire length of said converging zone, the passageway surround only said converging and throat zones.

* * * * *

UNITED STATES PATENT AND TRADEMARK OFFICE
CERTIFICATE OF CORRECTION

PATENT NO. : 4,619,812

DATED : October 28, 1986

INVENTOR(S) : Lawrence K. Murray  C. Jack Hart

It is certified that error appears in the above-identified patent and that said Letters Patent is hereby corrected as shown below:

In the heading under "United States Patent", after "Murray", add --et al.--

At item [75], after "Okla." add --; C. Jack Hart, also of Bartlesville, Okla.--

Signed and Sealed this

Tenth Day of February, 1987

Attest:

DONALD J. QUIGG

*Attesting Officer*      *Commissioner of Patents and Trademarks*